Patented June 24, 1930

1,767,999

UNITED STATES PATENT OFFICE

LLEWELLYN B. PARSONS, OF OMAHA, NEBRASKA, ASSIGNOR TO THE CUDAHY PACKING COMPANY, OF OMAHA, NEBRASKA, A CORPORATION OF MAINE

TREATMENT OF LARD

No Drawing.   Application filed June 1, 1929. Serial No. 367,836.

This invention relates to improvements in the treatment of lard and the production of improved lard products therefrom, and more particularly the invention relates to the process in which the lard is refined with sodium bicarbonate to remove free fatty acid from it and a resulting refined lard product is obtained well adapted to be subjected to hydrogenation and subsequent deodorization to give an improved hydrogenated and refined lard product.

The free fatty acid content of lard can be readily reduced to less than 0.1% by the use of caustic soda, but there are objections to the use of caustic soda in the refining of lard. The free fatty acid content of lard can be reduced to some extent by treatment with sodium bicarbonate, but under ordinary conditions of use a substantial amount of free fatty acid remains in the lard after the sodium bicarbonate refining treatment, amounting, for example, to around 0.15 to 0.2%.

I have found that, in order to produce a refined and hydrogenated lard with a high degree of stability and resistance to oxidation, it is important to reduce the free fatty acid content of the lard to less than about 0.1%. I have also found that it is possible, by using sodium bicarbonate under proper conditions, to reduce the free fatty acid content well below 0.1% so that a stable product can be produced from the refined product by hydrogenation.

I have found that when sodium bicarbonate is used in amount sufficient to react with from 2 to 3 times the fatty acid present in the lard, with admixture of water to the extent of about ¼% to 1% on the weight of the lard, and when the mixture is vigorously agitated at temperatures of above 140 to 200° F. for a sufficient period of time, e. g. 10 to 30 minutes, the sodium bicarbonate will react with the free fatty acids and reduce them to well below 0.1%, and the water will be removed during the process so that the soap will be formed and will be present at the end of the treatment as dry soap.

The removal of the dry soap presents some difficulty, but I have found that it can be readily removed from the lard by the addition of a small amount, e. g. around 0.4% on the lard, of a finely divided filter aid, such as Hyflo or Supercel. When such a filter aid is added and distributed throughout the treated lard, and when the lard is then filtered, the dry soap is readily removed therefrom. The treatment of lard in this way enables the free fatty acid to be reduced to around 0.05% or lower, and well below the limit (around 0.1%) below which it is important to reduce it before the subsequent hydrogenation treatment.

The refined lard, freed from free fatty acids as above described, can advantageously be subjected to hydrogenation with a suitable catalyst, such as an active reduced nickel catalyst, used in suitable amount, for example, around 0.1 to 0.2%, and at a suitable temperature and pressure, for example, around 250 to 350° F. and preferably around 300° F., and under a hydrogen pressure of around 60 pounds, and with suitable agitation of the body of oil and catalyst during the introduction of hydrogen.

In hydrogenating lard to a limited and regulated extent for the purpose of improving its keeping qualities it is important to avoid carrying the hydrogenation too far and producing a product which is too hard. By testing the lard from time to time during the hydrogenation process it is possible to control and limit the hydrogenation to obtain a hydrogenated product which is still of a lard-like consistency.

After the hydrogenation is completed, the catalyst is filtered out and the hydrogenated lard is subjected to deodorizing with steam at suitable temperatures, around 280 to 350° F. after which the deodorized lard is filtered again and is then cooled and packaged.

The texture of the cooled lard depends somewhat upon the method of cooling employed, but the cooling is preferably carried out with agitation and with application of a cooling or refrigerating agent so that rapid cooling takes place, and so that air or other gas will be incorporated in the improved product as a result of the cooling and agitating treatment. By incorporating an inert gas, such as nitrogen or hydrogen, and packaging the resulting product in a sealed container, it will be protected from contact with the air and its keeping properties will thereby be still further improved.

The improved process of the invention will be further illustrated by the following specific example:

Lard of iodine value of about 71 and with melting point 38° C. and with free fatty acid content of 0.45% is refined with sodium bicarbonate added in the proportion of 4 pounds of sodium bicarbonate per 1000 pounds of lard and with the addition of 5 pounds of water per 1000 pounds of lard, and the mixture is agitated for 20 minutes at a temperature of about 180° F. About 0.4% of a filter aid, such as Supercel, is then added and the mixture filtered to remove the dry soap produced. The free fatty acid is reduced by this treatment to less than 0.1%.

The resulting refined lard is then hydrogenated with the addition of an active reduced nickel catalyst and the hydrogenation is regulated so that the product produced will have an iodine number around 55 to 60, a melting point of around 48 to 51° C., a smoke point of around 440 to 460° F., and titres of around 40.0 to 41.0° C.

After the hydrogenation, and after the filtering of the catalyst from the hydrogenated lard, it is subjected to deodorizing with steam, and the deodorized product is then cooled or chilled with suitable agitation and is then ready for packaging.

My investigations indicate that it is essential, for the production of an improved lard product with the desired resistance to oxidation and deterioration, to reduce the free fatty acid by refining the lard before it is hydrogenated, and that, with sodium bicarbonate refining, it is important to reduce the free fatty acid to below 0.1%. Lard with a high free fatty acid content, when hydrogenated, gave a product of poor keeping quality. Lard which was refined to remove the free fatty acid after hydrogenation, was also of poor keeping quality. But when the sodium bicarbonate refining treatment was carried out before hydrogenation and under conditions such as those hereinbefore described which will insure the removal more or less completely of the free fatty acid, the refined product can then be hydrogenated and subsequently deodorized to give a product of superior keeping qualities.

The lard product produced as hereinbefore described has many advantages over ordinary lard. The color is improved so that the product is snow-white when solidified and water-white when melted. The product is odorless and neutral in flavor, being suitable for the finest baking. The smoke point is high, making the product eminently suitable for deep frying. The product is comparable with or superior to hydrogenated vegetable oils now on the market in creaming quality and will cream over a wide range in temperature. This and other properties make the new product suitable for uses for which lard is not suitable, such as the baking of cakes and the preparation of icings. The stability and resistance to rancidity make the product far superior to lard in this respect.

I claim:

1. The method of treating lard to remove free fatty acids therefrom, which comprises subjecting the lard to the action of an excess of sodium bicarbonate in the presence of a limited amount of water and with vigorous agitation of the mixture at a temperature of about 140 to 200° F.

2. The method of treating lard to remove free fatty acids therefrom, which comprises subjecting the lard to the action of an excess of sodium bicarbonate in the presence of a limited amount of water and with vigorous agitation of the mixture at a temperature of about 140 to 200° F., adding to the resulting lard a small amount of filter aid, and filtering the same to remove the soap therefrom.

3. The method of treating lard to remove free fatty acids therefrom, which comprises treating the same with an amount of sodium bicarbonate sufficient to react with from 2 to 3 times the free fatty acids present and with admixture of an amount of water equal to about ¼% to 1% of the weight of the lard, and vigorously agitating the mixture at a temperature of about 140 to 200° F. until the sodium bicarbonate has reacted with the free fatty acid and the water has been removed and dry soap produced, and subsequently filtering the soap from the lard.

In testimony whereof I affix my signature.

LLEWELLYN B. PARSONS.